US011522977B2

(12) United States Patent
Suri et al.

(10) Patent No.: US 11,522,977 B2
(45) Date of Patent: Dec. 6, 2022

(54) SYSTEM AND METHOD TO OPTIMIZE COMMUNICATIONS IN TACTICAL NETWORKS BY COMPUTING AND USING INFORMATION VALUE

(71) Applicants: Niranjan Suri, Pensacola, FL (US); Giacomo Benincasa, Pensacola, FL (US); Laurel Sadler, Pensacola, FL (US)

(72) Inventors: Niranjan Suri, Pensacola, FL (US); Giacomo Benincasa, Pensacola, FL (US); Laurel Sadler, Pensacola, FL (US)

( * ) Notice: Subject to any disclaimer, the term of this patent is extended or adjusted under 35 U.S.C. 154(b) by 178 days.

(21) Appl. No.: 15/289,314

(22) Filed: Oct. 10, 2016

(65) Prior Publication Data

US 2017/0104833 A1    Apr. 13, 2017

Related U.S. Application Data

(60) Provisional application No. 62/239,331, filed on Oct. 9, 2015.

(51) Int. Cl.
| | |
|---|---|
| *H04L 29/08* | (2006.01) |
| *H04L 12/24* | (2006.01) |
| *H04L 12/26* | (2006.01) |
| *H04L 67/61* | (2022.01) |
| *H04L 67/12* | (2022.01) |

(52) U.S. Cl.
CPC ............. *H04L 67/61* (2022.05); *H04L 67/12* (2013.01)

(58) Field of Classification Search
CPC .............................. H04L 67/322; H04L 67/12
See application file for complete search history.

(56) References Cited

U.S. PATENT DOCUMENTS

| | | | | |
|---|---|---|---|---|
| 10,708,654 | B1* | 7/2020 | Moraghan | H04N 21/2547 |
| 2002/0101822 | A1* | 8/2002 | Ayyagari | H04L 47/24 370/465 |
| 2007/0291765 | A1* | 12/2007 | Boley | H04L 47/2416 370/395.21 |
| 2007/0297416 | A1* | 12/2007 | Boley | H04L 47/10 370/395.21 |
| 2008/0209026 | A1* | 8/2008 | Qi | H04L 67/12 709/223 |
| 2008/0258880 | A1* | 10/2008 | Smith | H04L 67/12 455/404.2 |
| 2012/0215893 | A1* | 8/2012 | Bisdikian | G06F 9/5011 709/223 |
| 2014/0105005 | A1* | 4/2014 | Agrawal | H04W 28/0268 370/235 |
| 2015/0016248 | A1* | 1/2015 | Meier | H04L 67/568 370/230 |
| 2017/0104833 | A1* | 4/2017 | Suri | H04L 67/12 |
| 2018/0205546 | A1* | 7/2018 | Haque | H04L 9/3213 |

FOREIGN PATENT DOCUMENTS

CN       106663169 A * 5/2017 ............. G06F 21/56

\* cited by examiner

*Primary Examiner* — Christopher B Robinson
(74) *Attorney, Agent, or Firm* — J. Wiley Horton

(57) ABSTRACT

A software-based system for prioritizing Information Objects on the basis of their importance to a particular potential recipient or recipients. The operative concept is broadly referred to as the "Value of Information." The inventive system decides to send (or not send) a particular Information object to a particular user based on an inferred "value" that particular Information Object has for that particular User.

24 Claims, 5 Drawing Sheets

SYSTEM AND METHOD TO OPTIMIZE COMMUNICATIONS IN TACTICAL NETWORKS BY COMPUTING AND USING INFORMATION VALUE

CROSS-REFERENCES TO RELATED APPLICATIONS

This non-provisional patent application claims the benefit of provisional application Ser. No. 62/239,331. The provisional application listed the same inventors.

STATEMENT REGARDING FEDERALLY SPONSORED RESEARCH OR DEVELOPMENT

Work leading to this application has been sponsored by the Office of Naval Research and the U.S. Army Research Laboratory.

MICROFICHE APPENDIX

Not Applicable

BACKGROUND OF THE INVENTION

1. Field of the Invention

This invention relates to the field of communications. More specifically, the invention comprises a system for prioritizing available information on the basis of its value to a particular user.

2. Description of the Related Art

Modern data gathering and communication systems have the potential to accumulate much more data than can be reliably transmitted. This is particularly true in the case of military tactical networking environments. Tactical networking environments present many challenges in terms of bandwidth, latency, reliability, stability, and connectivity. Sensors increasingly generate very large data sets that are too large to feed to all network nodes in a timely manner. It is therefore important to prioritize the available information. Unfortunately, whether a particular data set is a priority often depends upon the perspective of the user. For example, an infantry squad commander would consider sensor information indicating that a "red force" scout squad was just to the west of his position a high priority. However, an unmanned aerial vehicle operator tasked with gathering electronic signals over a large area would not consider that information to be important. The present invention seeks to assign a value to a piece of information based on the perspective of the potential user of the information.

FIG. 1 provides a simplified depiction of a military command and control network. Tactical operations center 12 seeks to obtain information from various field units and ultimately direct and coordinate their activities. Satellite 10 provides a bidirectional communication link 30 with tactical operations center 12. Several communications vehicles 14 are located in the field and communicate with satellite 10 via communication links 32, 34, and 36. In addition, one communication vehicle 14 has a separate bidirectional communication link 40 with unmanned aerial vehicle ("UAV") 22.

Each communication vehicle 14 also supports a Mobile Ad hoc Network (commonly referred to as a "MANET"). MANETs are often automatically assembled from authorized nodes that are found to be in radio range. Individual nodes frequently join and drop off a MANET as relative positions and communication conditions change.

In the scenario depicted, three separate MANETs are in existence. MANET 16 supports communications with an artillery unit including field gun 26. MANET 18 supports communications with multiple dismounted soldiers 24. MANET 20 supports communications with mortar crew 28. A command issued from tactical operations center 12 and intended for dismounted soldiers 24 travels up through communication link 30 to satellite 10, down through communication link 34 to vehicle 14 and through MANET 18 to one or more dismounted soldiers 24.

In addition to the communication links shown, many others may be present. For example, vehicles 14 may directly communicate with each other when in range. In addition, operations center 12 may directly communicate with vehicles 14 or other assets that are within range.

Sensors onboard UAV 22 may produce a huge amount of information. Even infantry personnel are expected to carry autonomously operated sensors in the "soldiers-as-sensors" paradigm. These sensors often operate continuously. Soldiers may also be generating reports, including large image or video files. If all this harvested information is fed onto a command and control network the available processing and transmission bandwidth can be rapidly overwhelmed.

Military communication networks created to carry information to and from the battlefield are now commonly referred to as "Tactical Edge Networks" ("TENs"). Although those skilled in the art are familiar with the characteristics of Tactical Edge Networks, some background explanation may be helpful. Many types of nodes typically operate in the tactical environment. Some are mobile, such as manned and unmanned ground and air vehicles and portable devices carried by dismounted soldiers. Other nodes are stationary, such as tactical operation center 12 and unattended servers (often grouped into wireless sensor networks to perform coordinated information gathering and object tracking tasks). Most of the nodes communicate through wireless links of various types (satellite, cellular, and ad-hoc), usually in a hostile RF environment. As a result, in the tactical environment, severely constrained bandwidth, highly varying communication latencies, disconnected nodes, and network partitions are more the norm than the exception.

From the information-centric perspective, the objective of communications middleware operating in Tactical Edge Networks is to manage discretized units of information (henceforth referred to as "Information Objects" or "IOs") and deliver them to consumers in the most effective way. IOs may assume many forms, such as: (1) location data for a friendly unit, (2) location data for an enemy unit, (3) a graphic such as a map, (4) a detailed aerial image, (5) a document such as an intelligence report or fragmentary order, or (6) a full-motion video clip.

In a military context, information may be deemed valuable if it increases the situational awareness ("SA") of the recipient and/or causes the recipient to take some action for a better outcome. The overall objective is to convey useful information to support decision making while reducing bandwidth consumption, delivery latency, and cognitive workload. Any reduction in bandwidth utilization alleviates the constraints of TENs and is beneficial. Furthermore, the sorting and delivery of IOs according to priority reduces the latency of delivery of important information.

While sensing, computation, and storage capabilities have advanced rapidly in recent years, communication capabilities in tactical networks have not been able to achieve a similar growth rate. Sensors increasingly generate very large data sets that exceed the ability of tactical networks to transfer and disseminate them in a timely manner. Furthermore, a rapid decrease in the cost of sensors, combined with the desire to cover larger areas with persistent sensing capabilities, have resulted in a wide-scale deployment of sensors in increasing numbers. The gap between the volume of information that is generated and the subset of that information that can be successfully delivered to consumers is growing wider.

These trends have motivated researchers to increasingly focus on the challenging problem of filtering information and of prioritizing and transmitting only those subsets that would be useful to consumers. In fact, recent research in multiple disciplines has raised the question of determining the "Value of Information" ("VoI"). VoI focuses on the filtering and prioritization of information according to the corresponding value perceived by the consumer on an individual basis.

Software-based solutions that can analyze information and infer its value represent a natural complement for tactical communications middleware. Tactical communications networks are designed to withstand node mobility and communication path disruptions and to exploit the scarce communication resources in the most efficient way, typically by implementing smart and reliable message prioritization mechanisms and data fusion. VoI-based solutions carry the potential to further reduce the bandwidth requirements and improve the communication latency by delaying the delivery of non-critical information to ensure that high-priority information can reach consumers that need it in a timely manner.

Another important motivation for filtering information based on its value to a particular consumer is to reduce information overload. Delivering and presenting unnecessary information to soldiers actively performing a task at the very least results in an unnecessary increase in their cognitive workload. In the worst case, it could become a distraction and cause them to make mistakes.

The present invention seeks to infer an appropriate value for each Information Object from the perspective of an individual user. Using this approach information that is needed by a particular user is prioritized for transmission to that user.

BRIEF SUMMARY OF THE PRESENT INVENTION

The present invention comprises a software-based system for prioritizing Information Objects on the basis of their importance to a particular potential recipient. The operative concept is broadly referred to as the "Value of Information." The inventive system decides to send (or not send) a particular Information object to a particular user based on an inferred "value" that particular Information Object has for that particular User.

In a preferred implementation, the invention serves as middleware in a tactical communication network. This middleware preferably considers all potential users and ranks and transmits available Information Objects according to the value inferred for each Information object.

Figure 1:
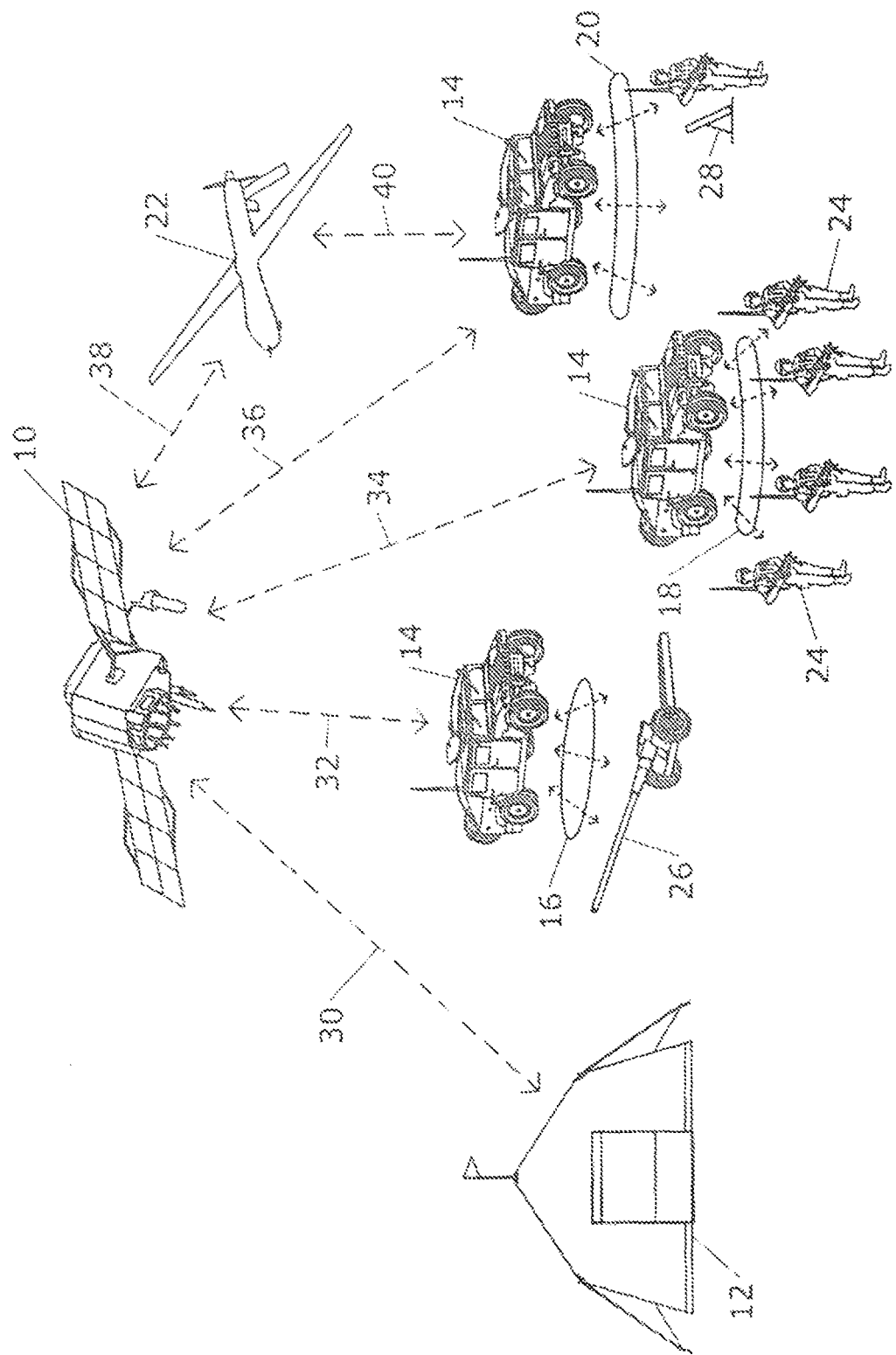
FIG. 1 is a schematic view, showing a prior art military command and control communications network.

REFERENCE NUMERALS IN THE DRAWINGS 10 satellite
12 tactical operations center
14 communications vehicle
16 MANET
18 MANET
20 MANET
22 UAV
24 dismounted soldier
26 field gun
28 mortar crew
30 communication link
32 communication link
34 communication link
36 communication link
38 communication link
40 communication link
42 communication link
44 communication link
46 communication link
48 communication link
50 communication link

DETAILED DESCRIPTION OF THE INVENTION

As explained in the "Background" section, FIG. 1 shows a very simplified depiction of a military communication network. While this environment is not the only application or the present invention it is a good exemplary application. Communication capacity in such an environment is limited by many factors. There is almost always more information needing to be sent than capacity to send it. Thus, prioritizing and selecting information for dissemination is a very important function.

Sensor networks in particular tend to create far more information than can be effectively disseminated. Most sensors create data irrespective of whether that data has any value to the particular recipients. Research in sensor networks, where strict constraints on computation, energy, and channel access make communications particular expensive, has identified two useful metrics for ranking Information Objects. These metrics are "Quality of Information" ("QoI") and "Value of Information" ("VoI").

"Quality of Information" is an objective and intrinsic measure of characteristics of an Information Object ("IO"). For example, an IO containing a digital image might have a QoI value defined by its resolution level, clarity, and contrast. In some cases it is possible to provide a software system that determines a QoI of an IO by analyzing its contents. As a simple example, IO's generated by infrared sensors will have a higher QoI at night compared to visual sensors (and vice-versa in the daylight). In a more complex example, a software system can examine video images and determine whether they depict any significant moving objects. An image sequence with a moving object may be given a higher QoI value. An image sequence including large moving objects (armor versus infantry) might be assigned a still higher value.

In still more complex applications it may be preferable to have a human operator assign a QoI. A human operator could be placed "in the loop" for many different types of IOs. As one example, it may be preferable to have a human operator influence the QoI value assigned to an intelligence report or a weather forecast.

On the other hand, the "Value of Information" ("VoI") metric represents an external and subjective value that classifies an IO according to the utility it provides to a particular potential recipient. The word "external" in this context means that the VoI is external to the Information Object itself. As an example, a very sharp reconnaissance image of a river valley might have a high Quality of Information value. However, when considered from the perspective of a rifle squad commander located 50 km away, it likely has very little value. Thus, for the perspective of one particular user (the rifle squad commander), the VoI of the river valley image is very low.

VoIs are dynamic values that change according to many factors. Obviously, the same IO will have differing VoIs for different potential recipients. Continuing the reconnaissance image example—the very same image might have a high VoI for a second squad commander who is actually in the valley that was photographed. A particular Information Object's VoI is generally a function of (1) its QoI, (2) its relevance to a particular consumer given the consumer's current context, and (3) the previous history of IO's sent to the particular consumer.

While Quality of Information and Value of Information are novel concepts, researchers have investigated their use in steady-state operational conditions. These investigations have applied multiple-criteria decision making solutions such as the Analytic Heirarchy Process developed by Bisdikian et. al., or the Von Neumann-Morgenstern utility functions explained by Cansever. These earlier works employ static values for VoI. The objective is essentially congestion control.

Of course, military Tactical Edge Networks do not exist in a steady-state. They are in fact one of the most dynamic communication environments known. The communication environment itself varies constantly as many of the network nodes move in space. Even more significantly, the contexts and mission objectives of all the personnel and devices operating in the environment change. An intelligent middleware solution for a Tactical Edge Network must be able to consider multiple and dynamic VoIs for each Information object, according to each potential recipient and the context of each potential recipient. Such a system must be able to implement dynamic IO filtering and prioritization policies. Since contextual information for a particular user might be out of date, the system preferably includes a reasoning component that is capable of dealing with missing data and uncertainty regarding future contexts and mission objectives. Such a system is preferably able to forecast the future VoI for a given IO and all the potential consumers of that IO. Finally, the middleware should allow VoI determination to dynamically adapt based on feedback from the users.

As one simple example, an infantry squad might represent one node on a Tactical Edge Network. If the squad is proceeding through low terrain (such as a ravine) and communication is lost, the system is preferably able to infer that this loss of contact represents a temporary signal interruption rather than the loss of the squad itself. Certain information might still be given a high VoI with respect to that squad. However, if a second squad reports that the first squad was ambushed and is falling back, then the VoIs with respect to the first squad should be dynamically updated.

Calculating the actual VoI of an IO for a particular consumer is challenging, as it requires the inventive system to model each consumer in terms of their existing knowledge, their objectives, their information needs, and their decision-making strategy. As an example, if a particular user already possesses an equivalent to an Information Object currently under consideration, then the VoI for that IO (with respect to this one particular potential recipient) is very low.

Figure 2:
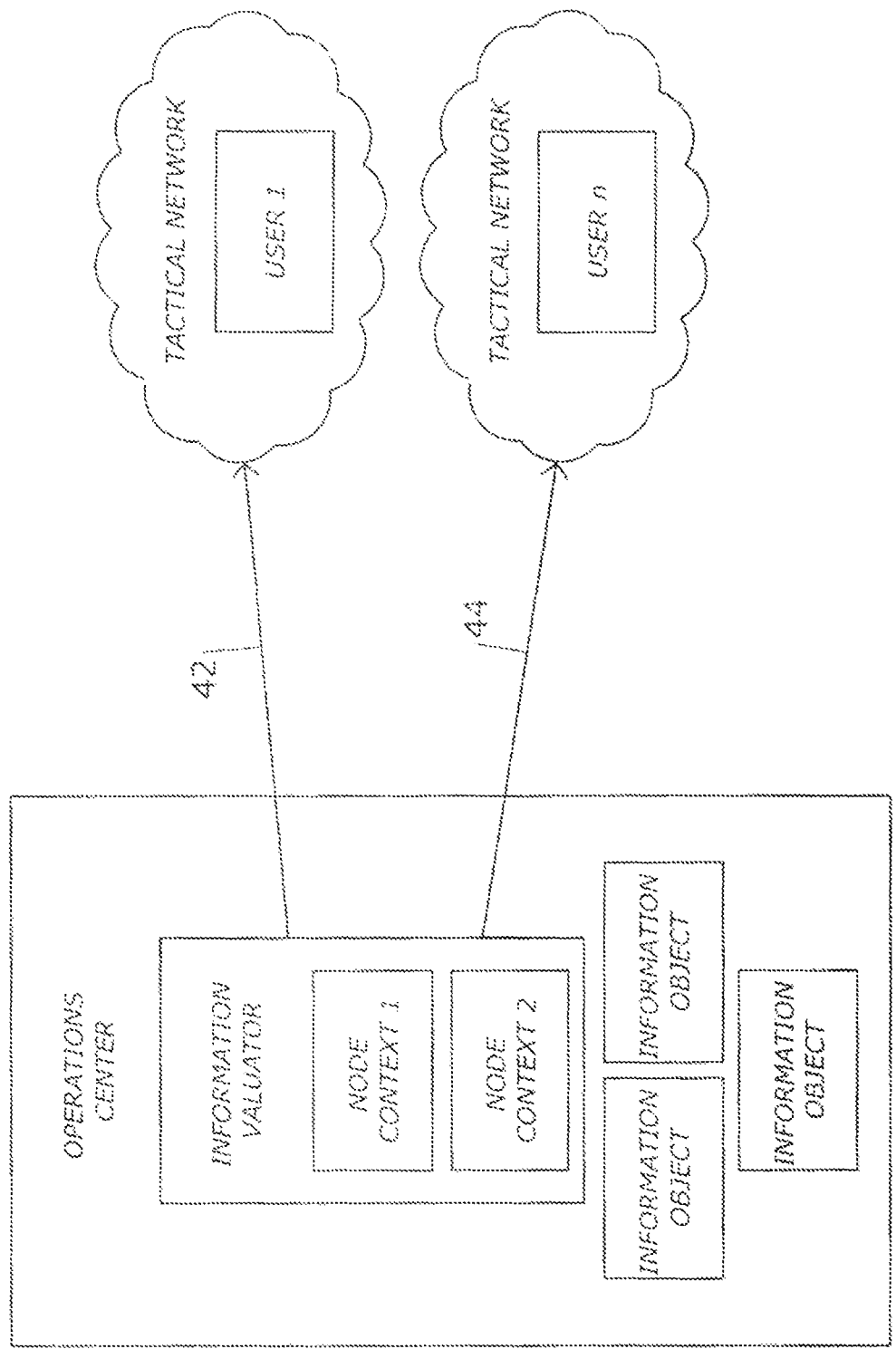
FIG. 2 is a schematic view, showing communications from an operations center to an edge network.

In deploying the invention in a tactical environment, three different patterns of exploiting VoI-based information can be identified. The first pattern applies to information available at a command/operations center flowing out into the field. This pattern is shown in FIG. 2. The operations center has in its possession multiple Information Objects, with new Information Objects arriving or being generated on a continuous basis. In the field, multiple tactical networks may be accessed via communication links 42, 44. The intuition in this scenario is that the operations center is essentially an enterprise network node, with very few constraints on computation, storage, and network resources.

However, not all of the information available at the operations center can be transmitted to the tactical edge given the capacity limitations. Therefore, each of the dismounted soldiers (user 1 through user n) reports their current context (denoted as the user context) to the operations center where an information valuator component examines the available IOs (and new incoming IOs—for example from deployed sensor networks) to determine their VoI. The information valuator then filters out IOs that do not satisfy a relevance threshold, prioritizes the IOs that are selected, and transmits those to the users. In this deployment pattern, data from sensor networks is first transmitted back to the operations center from one or more sensor network gateways (via a number of possible network links) before being evaluated, filtered, prioritized and transmitted to dismounted users.

Figure 3:
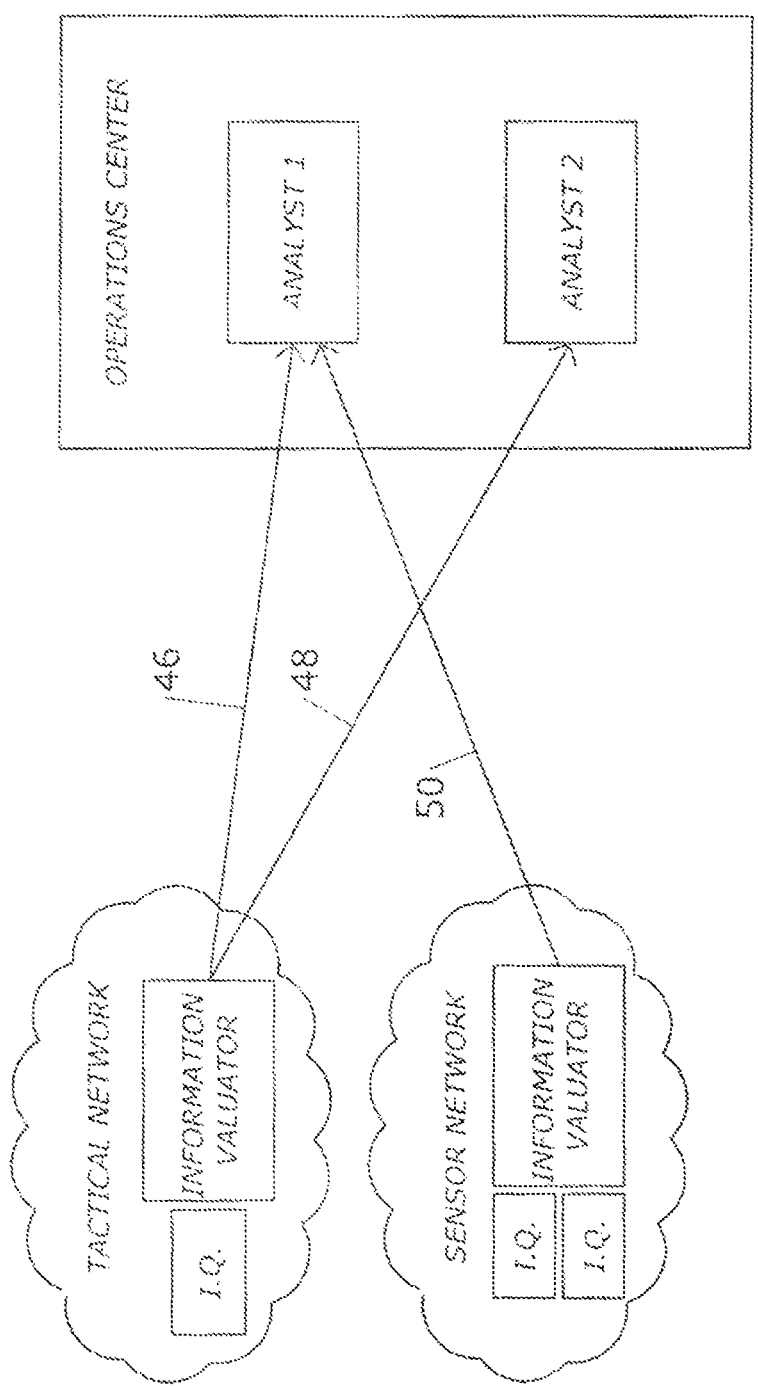
FIG. 3 is a schematic view, showing communications from an edge network to an operations center.

The second pattern of exploiting VoI-based information concerns the transmission of information collected by the various tactical and sensor networks back up to the operations center. FIG. 3 depicts this scenario. The consumer in the operations center may be an analyst, or other tactical network users that are connected to the operations center.

In this case, the IOs are generated by sensors as well as soldiers and include tracks, detections, pictures, reports, and other potentially large objects. As discussed before, the tactical network does not have the capacity to transfer all of this data back to the operations center. Therefore, in this second deployment pattern, IOs increasingly stay where they are gathered, and are pushed out of the tactical network to the operations center based on demand. For example, an analyst may express his or her interest in different types of IOs, which would represent their user context. These user contexts would be pushed out to sensor network gateway nodes, where valuator components would match locally generated IOs to the consumers. Again, IOs that satisfy a relevance threshold would be selected, prioritized based on their relevance, and transmitted to the consumers.

Figure 4:
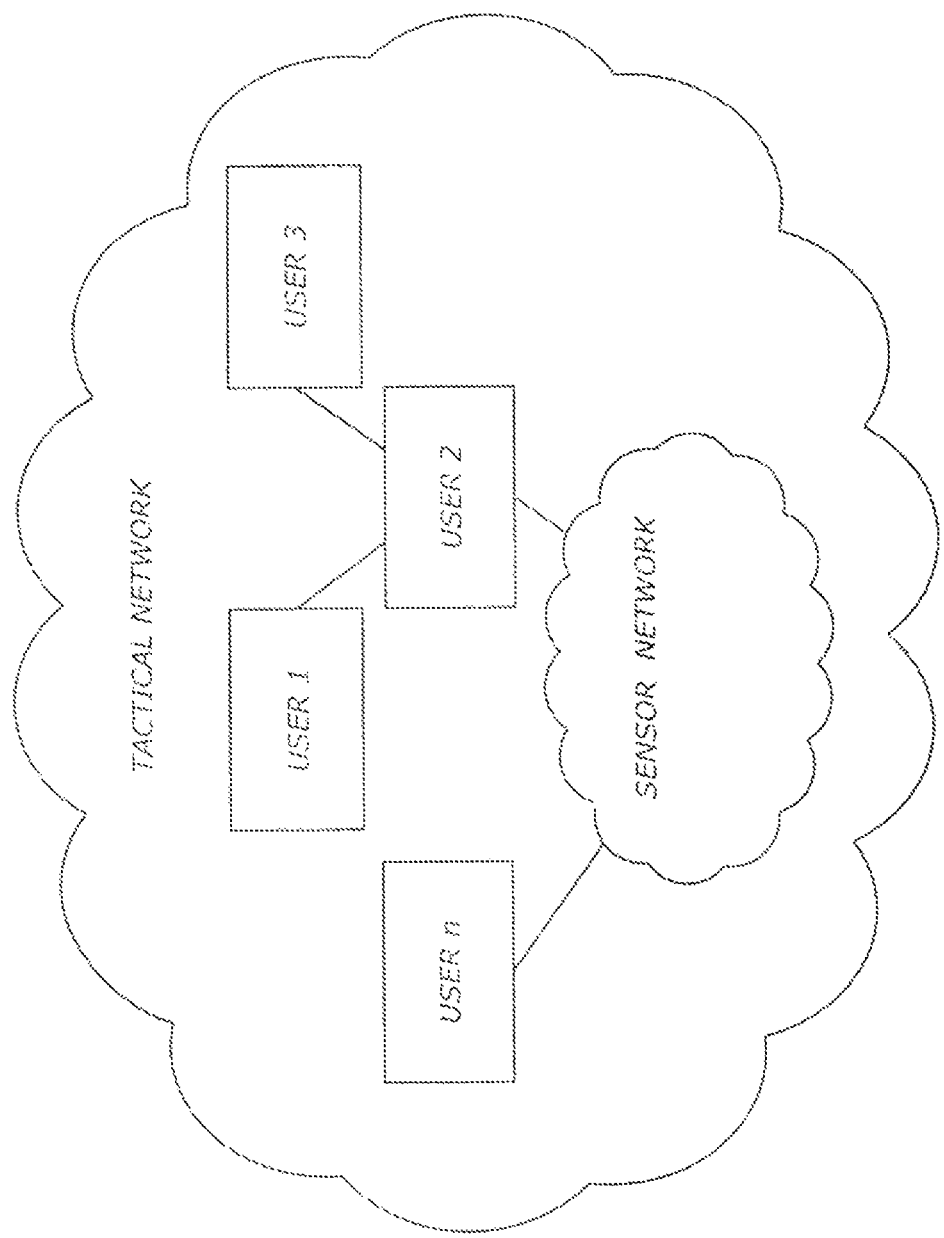
FIG. 4 is a schematic view, showing communications at the edge network.

The third deployment pattern applies to information sharing directly at the tactical edge—for example from one soldier to another or from a sensor network to a soldier. This scenario is shown in FIG. 4. Unlike the first two cases, these peer-to-peer exchanges occur on an ad-hoc basis based on potentially opportunistic contacts between the edge users. Hence, the user contexts are not pre-shared but exchanged upon contact, at which point a node with relevant IOs would push those to the other node. While not shown in the diagram, user nodes and sensor network gateway nodes contain information valuators as well as the node contexts for connected peers/users (The words "peer" and "user" are used interchangeably—a user is represented by a node that is a peer on the network).

A preferred implementation of the present invention uses middleware in a VoI-based information dissemination system. The inventive system is able to support the scenarios depicted in FIGS. 2-4 though currently the testing of the system has only been extended to the scenarios in FIG. 2 and FIG. 4.

The inventive system implements a peer-to-peer architecture, where the same node can act as a consumer and provider of information to other nodes. The system builds on the concepts of information dissemination in tactical environments that were the subject of the U.S. Pat. No. 8,493,902, which is hereby incorporated by reference.

Figure 5:
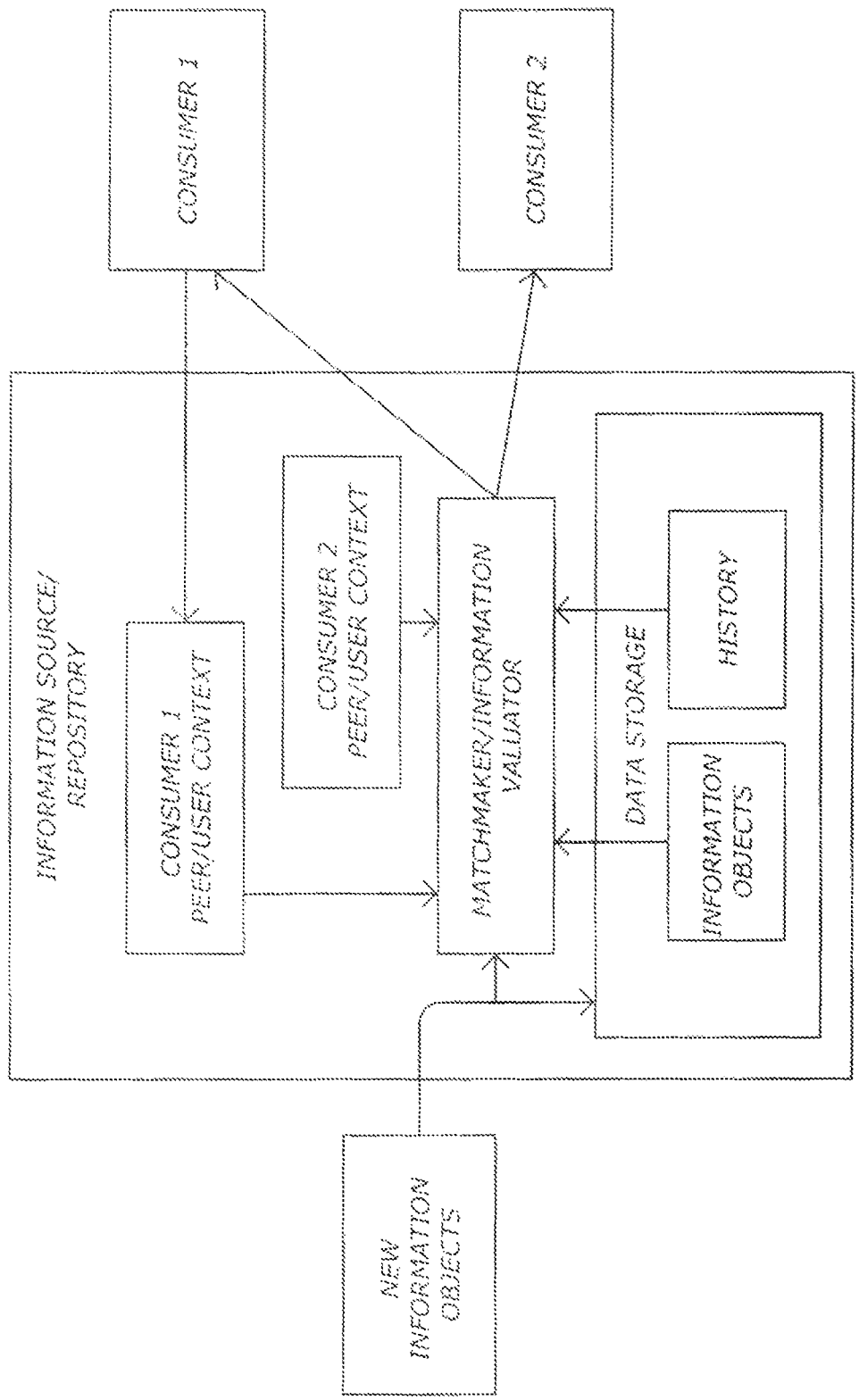
FIG. 5 is a schematic view, showing high-level component architecture for one embodiment of the present invention.

FIG. 5 shows the high-level architecture of the inventive system. The figure shows the key components in the system and the interactions with information producers and consumers. In this middleware architecture, consumer nodes generate and push their context to other nodes that are potential sources or repositories of information. The source nodes have a matchmaker component that evaluates the value of each IO against a consumer node's context. IOs that have a value higher than a chosen or pre-determined relevance threshold are then transmitted to the appropriate consumer. IOs that have been sent to a consumer are tracked in a history log, so that they would not be considered again in the future.

The matchmaker is triggered by two events—either the arrival of new IOs or changes to a consumer node's context. When a new IO arrives, it is held in the local data store and evaluated by the matchmaker for all known consumers. On the other hand, if a peer node context changes, all IOs that are already in the data store and that were not already transmitted are examined to see if any of them would be of value to the consumer given the updated node context. If so, those are transmitted to the consumer and tracked in the history store.

The inventive system adopts a pragmatic, computationally efficient approach to determining the VoI of an IO for each user/consumer. The evaluation function depends on the data type of the IO. The user node context representation in the system preferably includes a user's current location, a projected route (or routes), along with any temporal information (usually the result of a route planning tool), type of mission, role of the consumer, current activity, as well as policies about the value to be assigned to an IO based on the metadata. Given that a vast majority of tactical information is geographically driven, extra flexibility is preferably provided in controlling the valuation based on geographical proximity. In particular, the user context can specify the notion of a "useful distance" for different IO types, which is taken into account when evaluating the VoI based on geographical proximity.

Note that the evaluation is more than a simple geographical filter. In particular, the evaluation considers future planned positions (based on planned routes) in addition to the current position. Therefore, the system will match IOs that may not be currently relevant to a consumer based on the consumer's current position, but might be relevant to where the consumer is expected to be in the future, with the value being inversely proportional to the expected time at that position.

For example, with tracks (position updates about entities), the system will compute the degree of change of the track from the last update that was sent to a consumer as part of determining the value of that track. This also takes into account the distance of the track from the consumer. A track that moves 100 m, but is 1 km away, is assigned a higher value than a track that moves 100 m, but is 10 km away.

The rate of movement is in itself a good proxy for distance-based relevance. However, if the identity of a specific object is known, this may also be taken into account. Using this approach, an infantry ground commander will receive information about a ground-attack aircraft that is 100 km away and moving in his direction as a priority over an enemy infantry squad that is only 10 km away. An airborne platform, given its speed, has a much wider range of influence than a dismounted soldier walking on the ground. The range of influence policies in the inventive system are preferably specified on the basis of the MIL-STD-2525 symbol code for the entity, which is part of the metadata of the IO. Using the MIL-STD-2525 symbol code makes it very flexible to change the valuation policies in the system. For example, it is simple to express a policy in the system that assigns a high value to airborne elements versus ground elements. Future implementations will also preferably take into account the lines of bearing/direction of motion (moving towards a consumer versus moving away) when computing the value of that particular track for a given consumer.

The user context also specifies the weights for a ranking function, which can adjust the relative importance across the different parameters of geographical proximity, temporal proximity, mission relevance, role relevance, and activity relevance. The system also preferably supports custom policies for evaluating VoI on other metadata attributes of IOs. For example, the following code excerpt shows a simple policy that computes value based on the Affiliation attribute in the metadata:

```
<?xml version="1.0"?>
<RankerPolicy>
    <Type>Static</Type>
    <Attribute>Affiliation</Attribute>
    <Weight>4.0</Weight>
    <Alternative>
        <Match>Coalition</Match>
        <Value>5.0</Value>
    </Alternative>
    <Alternative>
        <Match>US</Match>
        <Value>6.0</Value>
    </Alternative>
    <Alternative>
        <Match>Hostile</Match>
        <Value>9.0</Value>
    </Alternative>
</RankerPolicy>
```

Determining the VoI of an IO for a user then consists of evaluating the metadata of the IO against that user node context. In addition to the above parameters, other attributes of the IO, such as the source (e.g., the commander of the mission), pedigree, and designated importance level are taken into consideration. As mentioned earlier, once the VoI is calculated for an IO, if the VoI falls below a configured "minimum value/worth" threshold (specified as part of the consumer node context), the IO is not transmitted to the consumer. If the VoI is higher than the relevance threshold, the IOs are sorted in priority order, based on their VoI, and transmitted to the consumer accordingly.

The context that is pushed to other nodes can change dynamically over time to reflect changes in the nature of information that is desired (or would be of value) to the consumer. Changes can include updates to policies (such as the one shown in the code segment above), adjustments to the weights assigned to the different factors of geographical and temporal proximity, range of relevance based on the MIL-STD-2525 symbol code, changes to planned routes, current position, etc. This allows a consumer to specify and control the nature of information that is desired. The inventive system can be integrated with many different types of user interfaces—some providing full functionality and others providing only limited functionality.

Since the matchmaker may run on resource-constrained nodes, the computational cost should be considered. In the inventive system, the computational complexity is O (n), where n is the number of IOs in the data store. If a peer node context changes, all n IOs in the data store have to be evaluated against the updated peer node context. On the other hand, when a new IO arrives, it has to be evaluated against each peer (so, if there are m peers, there are m evaluations). The computational cost is kept low by not considering interactions between IOs. For example, the inventive system preferably does not consider that sending a report from Sensor 1 may make it unnecessary to send a different report from Sensor 2 since both the reports were covering the same target.

IOs are also immutable, so an update to an existing IO is handled as a new IO through the system. Furthermore, the inventive system preferably linearizes the IOs so that they can be handled in some sequential order. The simplest approach to linearization is to use a metric such as the creation time or arrival time of the IO at a node in the network (for example, a node that has to process the IOs).

Because military operations are inherently group efforts, it is often the case that multiple consumers have similar node contexts, and therefore have interest in receiving similar subsets of IOs. For instance, all the members of a team may be interested in receiving situational awareness data from the area of deployment. A naïve implementation of Value-Based Information Dissemination that transmits the selected IOs objects via unicast may even under-perform a simpler IP multicast-based implementation that blindly transmits all the IOs to every consumer, if the overlap among the matched subsets is large. In the inventive system, while the IO selection is performed by matching a single consumer node context against a single IO metadata, the actual transmission of the IOs is performed by taking the network topology into account. The matchmaker component aggregates IOs that need to be sent to multiple consumers in the same subnetwork and then transmits a single copy of the message via multicast.

The invention relies on a reliable multicast capability such as described in U.S. Pat. No. 8,493,902 (which, in turn, is based on hop-by-hop UDP multicast). Because IOs are multicast, nodes may receive irrelevant IOs, which are not processed, but are locally cached for possible later use. If a previously cached IO becomes relevant in the future, the node is simplify notified that the IO is now relevant to the consumer, without having to transmit the IO again, thereby saving on bandwidth. The system described in the '902 Patent goes even further with its implementation of opportunistic listening, where each network packet is self-contained and self-describing, which allows intermediate nodes that listen in on this traffic to be able to cache the packets, and potentially make them available to other peers at a later point in time. This approach increases the availability of the information in the face of disconnections and network partitioning.

It is important to note that false positives (where the information is not relevant but is not filtered) can be tolerated because while the system may not save as much bandwidth as possible, it would still be an improvement over the baseline. However, false negatives (where information is relevant but is still filtered) are detrimental as it might cause the consumer to lose situation awareness and/or make an incorrect decision.

An experimental evaluation of an embodiment of the invention was performed using a reference scenario based on "Agile Bloodhound"—an annual US Department of Defense (DoD) Office of Naval Research (ONR) sponsored technology demonstration. This scenario uses a deployment pattern as depicted in FIG. 2. The scenario consists of multiple military hub vehicles connected via SATCOM to a command center (such as the example shown in FIG. 1). Each hub vehicle supports multiple dismounted soldiers, either on foot or in vehicles of their own, using a tablet/smartphone and communicating through a MANET. The scenario emulates a typical operation that involves a variety of information flows, including friendly (blue) force tracks, enemy (red) force tracks, sensor reports, documents such as intelligence reports, logistics reports, and messaging.

For the purpose of the experiment, only two data types were considered—tracks and sensor reports. The metadata and data format for tracks and sensor reports were XML messages as defined by the Marine Air-Ground Task Force (MAGTF) Command and Control (C2) Tactical Service-oriented Architecture (TSOA). However, the inventive system may be easily adapted to use other standardized metadata and data formats, particularly if they are XML-based.

Tracks were fed into the inventive system at the operations center from JTCW (the Joint Tactical Common Operating Picture Workstation), but could come from any number of track management systems such as DCGS (Distributed Common Ground System). Tracks were also generated by the vehicles on the move and by the dismounted soldiers at the edge. The reader should note that there are a wide variety of tracks, representing platforms ranging from ships to airborne vehicles to ground units, that are part of multiple, ongoing, sometimes unrelated missions. Therefore, not all tracks are relevant to every consumer.

Sensor reports are generated from a variety of sensors deployed throughout the area of operations. A sensor report typically contains metadata and a payload—typically an image. Each sensor report affects or covers a geographic sub-region. Again, not every sensor report is relevant to every consumer.

Three different information dissemination strategies were compared in the experiment: (1) a baseline strategy, in which all tracks and sensor reports are delivered via DisService's (DisService is described in the '902 Patent) reliable multicast communication function to each of the four clients; (2) a "naïve" VoI-based strategy in which each relevant IO is transmitted independently to each consumer; and (3) a preferred VoI-based strategy where data is aggregated and multiple transmissions of the same IOs on the same network links are avoided.

The naïve approach to implementing such a system has the potential to be highly inefficient in a scenario where there is a large degree of overlap between the IOs that are selected for a set of consumers in physical proximity, since the overlapping IOs would be duplicated on the MANET network as they are transmitted independently to each consumer. As mentioned earlier, the preferred VoI-based implementation aggregates data and avoids multiple transmission of the same IOs on the same network links, thereby saving bandwidth.

It is important to note that the results could vary widely based on the policy selected for the VoI-based filtering and prioritization, and on the actual scenario itself (in terms of the number of tracks, their positions, the number of sensor reports, their sizes, and their coverage). In fact, the preferred VoI-based implementation provides many customizable options for determining the VoI as well as setting the filtering relevance thresholds. As a result, the number of IOs transmitted by the three strategies to consumers are significantly different.

Table 1 (below) shows the results obtained for the subset of soldiers supported by one of the hub vehicles. In total, there were 3445 tracks and 510 sensor reports generated during the mission execution phase. Results for both the naïve implementation and the preferred VoI-based implementation are shown for the three different selectivity thresholds (high, medium, and low) defined by setting the corresponding useful distance to 0.5 kilometer, 1 kilometer, and 2 kilometers for sensor reports. In all cases, the geographic proximity filter for tracks was set to be 1000 kilometers, a large value to ensure that all nodes have the same common operating picture regarding tracks in their area of operations. This setting still resulted in tracks for unrelated missions being filtered out, but each of the four clients that are part of the same mission receive the same set of tracks (i.e., an overlap of 100%).

generated and the bandwidth available in the network to move all of that data. VoI-based approaches also have the potential of reducing operator overload by filtering out unnecessary information that can be distracting. Determining the VoI in a generic, open-ended system is a difficult, unsolved problem. However, the inventive middleware described in this disclosure exploits VoI in a tactical information management context. The preferred embodiment has been applied to the problem of disseminating information from an operations center to dismounted soldiers, and also between soldiers and sensor networks at the edge. Initial results are promising in terms of the bandwidth reduction.

The following lists some of the operative concepts found in the preferred embodiments. These concepts may be combined as desired:

(1) A "context state" provided for a consumer node computer may include anything relevant to determining a value-of-information for that particular node. Examples include geographic location, current track (a current position and current velocity), projected track, a mission objective, a current rank among other nodes (such as "commander" or "subordinate"), and a current workload (An engaged infantry squad leader does not want situational information beyond the next few minutes whereas a battalion commander does want such information);

(2) A consumer node computer may actually request a certain type of information object and this request may be made part of its context state. For example, the node may be running a route planning program that needs all intelligence

| | | Tracks | | | | Sensor Reports | | | Bandwidth (kb/sec) | | Performance Improvement | |
|---|---|---|---|---|---|---|---|---|---|---|---|---|
| | Se-lectivity | Total Number | Delivered Per Client | Filtered Out | Average Overlap | Total Number | Delivered Per Client | Filtered Out | Average Overlap | SATCOM | MANET | SATCOM | MANET |
| Baseline | N/A | 3445 | 3445.0 | 0 | 100.0% | 510 | 510.0 | 0 | 100.0% | 642.1 | 936.2 | | |
| Naïve | High | 3445 | 937.0 | 2448 | 100.0% | 510 | 105.5 | 315 | 75.9% | 361.9 | 466.8 | 43.64% | 50.14% |
| DSPro | | 3445 | 937.0 | 2448 | 100.0% | 510 | 107.8 | 315 | 76.9% | 350.7 | 328.9 | 45.39% | 64.86% |
| Naïve | Medium | 3445 | 937.0 | 2448 | 100.0% | 510 | 124.2 | 303 | 82.1% | 369.4 | 515.7 | 42.47% | 44.92% |
| DSPro | | 3445 | 937.0 | 2448 | 100.0% | 510 | 135.0 | 303 | 82.6% | 361.5 | 338.9 | 43.71% | 63.81% |
| Naïve | Low | 3445 | 937.0 | 2448 | 100.0% | 510 | 173.5 | 223 | 80.8% | 436.7 | 644.5 | 32.00% | 31.16% |
| DSPro | | 3445 | 937.0 | 2448 | 100.0% | 510 | 176.5 | 223 | 83.6% | 469.7 | 481.2 | 26.85% | 48.60% |

With regard to sensor data, the number of reports filtered out for each client varies according to selected dissemination strategy and, for the naïve and preferred strategies, to the configured relevance threshold. As can be seen in the results, applying a VoI-based filtering mechanism in this scenario is very effective, reducing SATCOM bandwidth utilization between 26.85% and 45.39% and MANET bandwidth utilization between 48.60% and 64.86%. The reader should also note that there is a small difference between the naïve and preferred strategies with the same selectivity, with delivery count being higher with the preferred implementation. This difference is a result of the preferred implementation being more efficient. It is able to send more reports to clients before their position (and consequently their node context) changes. Once the node context changes, any unsent reports that are no longer relevant are simply dropped.

In conclusion, Value of Information-based approaches to information management and dissemination are a particularly promising direction for tactical network communications. They are an effective mechanism to counter the increasing disparity between the volume of data gathered/ regarding "red force" units in a certain area. The request for that information could be generated by a computer program or a human operator;

(3) The consumer node computer system may be any device that includes a processor. Examples include smart phones, laptops, and dedicated mobile command systems;

(4) The consumer node computer system may also be something that generates information objects. As an example, it may be a processor running as part of a sensor array; and (5) The relevance threshold may vary for a particular consumer node computer system over time.

Although the preceding description contains significant detail, it should not be construed as limiting the scope of the invention but rather as providing illustrations of the preferred embodiments of the invention. One skilled in the art may easily devise variations on the embodiments described. Thus, the scope of the invention should be fixed by the claims ultimately drafted rather than the examples given.

Having described our invention, we claim:

1. A method for optimizing communication in a network, comprising:

(a) providing an information source/repository including a processor and an associated memory, said memory storing a plurality of existing information objects;
(b) providing a plurality of consumer node computer systems, with each of said consumer node computer systems being in communication with said information source/repository;
(c) each of said consumer node computer systems providing a context state to said information source/repository, wherein said context states are regularly updated;
(d) said information source/repository including an information valuator program running on said processor;
(e) defining a pre-determined value-of-information threshold for each of said consumer node computer systems;
(f) wherein upon receipt of a new information object, said information valuator program determines a value-of-information for said new information object for each of said consumer node computer systems in communication with said information source/repository, on the basis of both said new information object and said context state of each of said consumer node computer systems, with said processor then storing said new information object in said memory along with said value-of-information for said new information object for each of said consumer node computer systems;
(g) wherein upon receipt of a new context state from a particular consumer node computer system, said information valuator program determines a new value-of-information for each information object in said associated memory for said particular computer node computer system;
(h) said information source/repository transmitting said new information object to each consumer node computer system for which said determined value-of-information exceeded said pre-determined value-of-information threshold; and
(i) said information source/repository transmitting each of said existing information objects having a new value-of-information that exceeds said threshold to said particular consumer node computer system.

2. A method for optimizing communication in a network as recited in claim 1, wherein said information source/repository is part of an operations center.

3. A method for optimizing communication in a network as recited in claim 1, wherein said consumer nodes are also generators of new information objects.

4. A method for optimizing communication in a network as recited in claim 1, wherein said context state includes a geographic location of each of said consumer node computer systems.

5. A method for optimizing communication in a network as recited in claim 4, wherein said context state includes a projected route of each of said consumer node computer systems.

6. A method for optimizing communication in a network as recited in claim 1, wherein said context state includes route planning information for each of said consumer node computer systems, with said route planning information including an expected future time and future location for each of said consumer node computer systems.

7. A method for optimizing communication in a network as recited in claim 4, wherein:
(a) one of said information objects pertains to a specific geographic location; and
(b) said value-of-information determinations compare said specific geographic location to said geographic locations of each of said consumer node computer systems.

8. A method for optimizing communication in a network as recited in claim 6, wherein:
(a) one of said information objects pertains to a specific geographic location; and
(b) said value-of-information determinations compare said specific geographic location to said expected future geographic location of each of said consumer node computer systems.

9. A method for optimizing communication in a network as recited in claim 1, wherein said context state for one of said consumer node computer systems includes a stated need for a particular type of information.

10. A method for optimizing communication in a network as recited in claim 9, wherein said stated need is entered by a human operator.

11. A method for optimizing communication in a network as recited in claim 6, wherein:
(a) one of said information objects pertains to a moving object having a projected track; and
(b) said value-of-information determinations compare said projected track of said one of said information objects to said expected future geographic location of each of said consumer node computer systems.

12. A method for optimizing communication in a network as recited in claim 1, wherein said step of transmitting said new information object to each consumer node computer system for which said determined value-of-information exceeded said pre-determined value-of-information threshold includes aggregating multiple information objects into a single transmission.

13. A method for optimizing communication in networks, comprising:
(a) providing an information source/repository including a processor and an associated Memory, said memory storing a plurality of information objects;
(b) providing a plurality of consumer node computer systems, with each of said consumer node computer systems being in communication with said information source/repository;
(c) each of said consumer node computer systems regularly providing a context state to said information source/repository;
(d) said information source/repository including an information valuator program running on said processor;
(e) defining a pre-determined value-of-information threshold for each of said consumer node computer systems;
(f) wherein upon receipt of a new context state from a particular one of said consumer node computer systems, said information valuator program retrieves said information objects from said memory and determines a value-of-information for each information object for said particular consumer node computer system;
(g) said information source/repository transmitting each of said existing information objects having a new value-of-information that exceeds said threshold for said particular consumer node computer system to said particular consumer node computer system;
(h) wherein upon receipt of a new information object, said information valuator program determines a value-of-information for said new information object for each of said consumer node computer systems in communication with said information source/repository, on the basis of both said new information object and said context state of each of said consumer node computer systems, with said processor then storing said new information object in said memory along with said value-of-information for said new information object for each of said consumer node computer systems; and (i) said information source/repository transmitting said new information object to each consumer node computer system for which said determined value-of-information exceeded said pre-determined value-of-information threshold.

14. A method for optimizing communication in a network as recited in claim 13, wherein said information source/repository is part of an operations center.

15. A method for optimizing communication in a network as recited in claim 13, wherein said information source/repository is a generator of new information objects.

16. A method for optimizing communication in a network as recited in claim 13, wherein said context state includes a geographic location of each of said consumer node computer systems.

17. A method for optimizing communication in a network as recited in claim 16, wherein said context state includes a projected route of each of said consumer node computer systems.

18. A method for optimizing communication in a network as recited in claim 13, wherein said context state includes route planning information for each of said consumer node computer systems, with said route planning information including an expected future time and future location for each of said consumer node computer systems.

19. A method for optimizing communication in a network as recited in claim 16, wherein:
(a) one of said information objects pertains to a specific geographic location; and
(b) said value-of-information determinations compare said specific geographic location to said geographic locations of each of said consumer node computer systems.

20. A method for optimizing communication in a network as recited in claim 18, wherein:
(a) one of said information objects pertains to a specific geographic location; and
(b) said value-of-information determinations compare said specific geographic location to said expected future geographic location of each of said consumer node computer systems.

21. A method for optimizing communication in a network as recited in claim 13, wherein said context state for one of said consumer node computer systems includes a stated need for a particular type of information.

22. A method for optimizing communication in a network as recited in claim 21, wherein said stated need is entered by a human operator.

23. A method for optimizing communication in a network as recited in claim 18, wherein:
(a) one of said information objects pertains to a moving object having a projected track; and
(b) said value-of-information determinations compare said projected track of said one of said information objects to said expected future geographic location of each of said consumer node computer systems.

24. A method for optimizing communication in a network as recited in claim 13, wherein said step of transmitting said new information object to each consumer node computer system for which said determined value-of-information exceeded said pre-determined relevance threshold includes aggregating multiple information objects into a single transmission.

* * * * *